United States Patent [19]

Furukawa

[11] Patent Number: 4,527,036
[45] Date of Patent: * Jul. 2, 1985

[54] METHOD FOR PATTERN CONTROLLED ELECTRODE MOVEMENT FOR E.D.M.

[76] Inventor: Toshihiko Furukawa, 10-15, Tsukimino 1-chome, Yamato-shi, Kanagawa 242, Japan

[*] Notice: The portion of the term of this patent subsequent to Jan. 4, 2000 has been disclaimed.

[21] Appl. No.: 452,975

[22] Filed: Dec. 27, 1982

Related U.S. Application Data

[63] Continuation of Ser. No. 178,235, Aug. 14, 1980, Pat. No. 4,367,391.

[51] Int. Cl.³ ............................................. B23P 1/00
[52] U.S. Cl. ............................. 219/69 M; 219/69 C
[58] Field of Search .............. 219/69 M, 69 V, 69 C

[56] References Cited

U.S. PATENT DOCUMENTS

| | | | |
|---|---|---|---|
| 3,433,919 | 3/1969 | Braudeau et al. | 219/69 V |
| 4,152,570 | 5/1979 | Inoue et al. | 219/69 V |
| 4,230,926 | 10/1980 | Gaumond | 219/69 V |
| 4,367,391 | 1/1983 | Furukawa | 219/69 M |

Primary Examiner—Roy N. Envall, Jr.
Assistant Examiner—Alfred S. Keve
Attorney, Agent, or Firm—James C. Wray

[57] ABSTRACT

In an electro-discharge machining method for progressively conducting precise machining through relative approach movements between an electro-discharge machining electrode and a workpiece in the horizontal direction substantially perpendicular to a direction in which said electrode is opposed to said workpiece, the method comprises a step of dividing a movement region of said relative approach movements into a plurality of sections within the horizontal plane and a step of selecting trajectories of said relative approach movements for the respective sections for successively and progressively achieving the machining.

3 Claims, 4 Drawing Figures

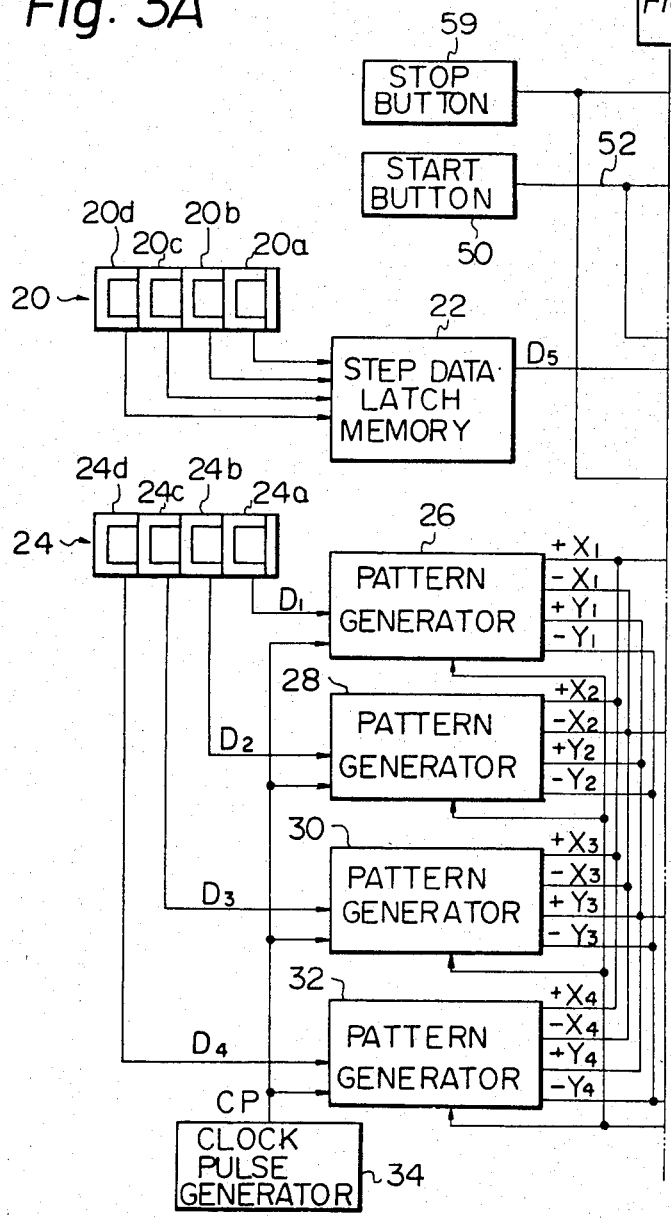

METHOD FOR PATTERN CONTROLLED ELECTRODE MOVEMENT FOR E.D.M.

This application is a continuation, of application Ser. No. 178,235, filed Aug. 14, 1980, now U.S. Pat. No. 4,367,391.

This invention relates to an electro-discharge machining method and apparatus, and more particularly to an electro-discharge machining method and apparatus which is capable of achieving precise electro-discharge machining.

In general, to machine a workpiece of a metal etc. by electro-discharge machining, using an electro-discharge machining electrode, the electrode is first shaped to have a size and a contour coinciding with a desired size and contour to be formed on the workpiece through the machining and positioned in an opposite relation to the workpiece, and then the electrode and the workpiece are subjected to relative approaching movement in the vertical direction to machine the workpiece for providing the desired size and contour by electro-discharging. However, such electro-discharge machining by simple relative movement in the vertical direction between the electrode and the workpiece cannot provide satisfactory precision in size and surface of the obtained product. By this reason, in a recently proposed electro-discharge machining method and apparatus, not only a relative machining operation in the vertical direction between the electrode and the workpiece is carried out to achieve rough machining or semi-finish machining but a relative approach operation in the horizontal direction between the electrode and the workpiece is repeated to an extent corresponding to a margin to be trimmed to achieve finish machining on the workpiece for obtaining precise dimensions and a surface of the machined workpiece (as disclosed, for example, in U.S. Pat. No. 4,168,426). However, the relative approach movement in the horizontal direction as proposed in this known method and apparatus only provides a fixed pattern of movement uniformly to the face of the workpiece according to the configuration of the electrode or the required configuration of the workpiece. Therefore, it is impossible to apply a precise finish-machining operation to a narrow corner portion of the workpiece or to locally apply an accurate finish-machining operation to a complicated portion of the workpiece. Thus, the conventional method and apparatus cannot provide a satisfactory result except for a portion having a relatively simple configuration. In addition, due to difficulty of precise local finish operation, the operating efficiency of the electro-discharge machining is not satisfactory, either.

It is therefore an object of the present invention to provide an electro-discharge machining method and apparatus which are capable of obviating the disadvantages involved in the known electro-discharge machining method and apparatus.

It is another object of the present invention to provide an electro-discharge machining method and apparatus which are capable of locally applying precise finish-machining onto a complicated surface of a workpiece.

It is still another object of the present invention to provide an electro-discharge machining method and apparatus which are capable of automatically achieving precise finish-machining in an electro-discharge machining.

In accordance with the present invention, there is provided an electro-discharge machining method for progressively carrying out precise machining through relative approach movements between an electro-discharge machining electrode and a workpiece in the horizontal direction substantially perpendicular to a direction in which said electrode is relatively opposed to said workpiece, which method is characterized by dividing a movement area of said relative approach movements into a plurality of quadrants within the horizontal plane and selecting trajectories of said relative approach movements for the respective quadrants for successively and progressively achieving the machining.

Further in accordance with the present invention, there is provided an electro-discharge machining apparatus for progressively conducting precise machining through relative approach movements between an electro-discharge machining electrode and a workpiece in the horizontal direction substantially perpendicular to a direction of vertical machining operation in which said electrode and said workpiece are opposed to each other, which apparatus comprises, pattern generating means for generating basic operation patterns for respective quadrants; pattern designating means for designating patterns of said relative approach movements to the respective quadrants within the horizontal plane; step amount designating means for designating step amounts of actual relative approach movements depending upon trajectories in the respective quadrants, the trajectories being proportioned to the designated patterns; computing and storing means for computing and storing trajectories for the actual relative approach movements based on pattern data designated by said pattern designating means and data from said step amount designating means; output control means for sequentially outputting data stored in said computing and storing means; and operating means for carrying out required relative approach movements according to data outputted from said computing and storing means.

Further objects and advantages of the invention will be apparent from the following description taken in connection with the accompanying drawings.

FIGS. 3a and 3b form a block diagram of one form of a control section in an electro-discharge machining apparatus embodying the present invention.

Figure 1:
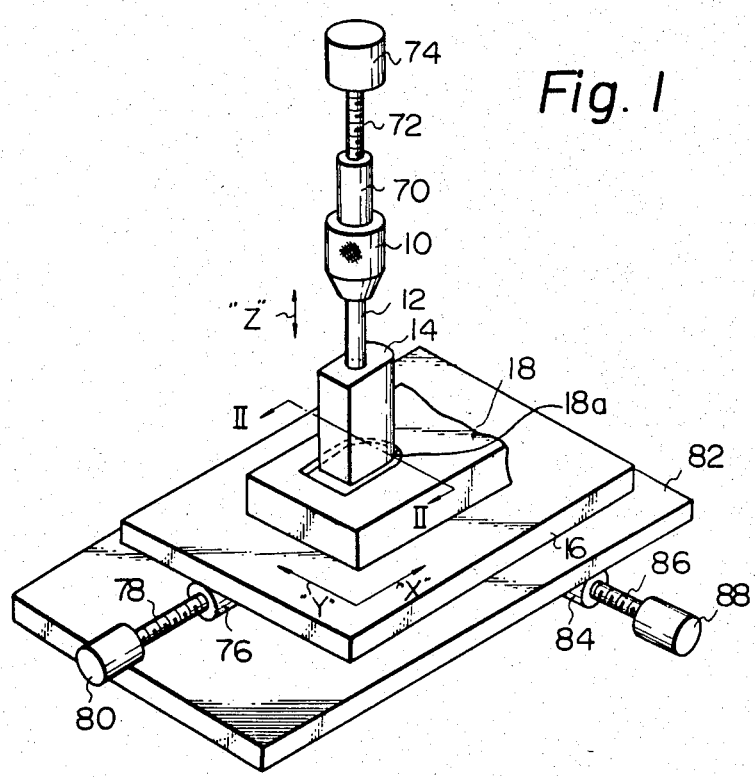
FIG. 1 is a diagrammatic perspective view of part of a machining portion in a general electro-discharge machining apparatus.

FIG. 1 shows a diagrammatic perspective view of an electro-discharge machining apparatus for explaining a common electro-discharge machining method and apparatus which carry out relative approach movements in the horizontal direction. An electro-discharge machining electrode 14 is provided with a stem 12 and formed to have a desired configuration and size. The electrode 14 is held by and connected to a spindle 10 of the electro-discharge machining apparatus so as to be movable in Z-axis direction (vertical direction). A pulse voltage for electro-discharge machining is applied by a pulse voltage source (not shown) across a gap between the electrode 14 and a workpiece 18 placed on a table 16 of the electro-discharge machining apparatus in an opposite relation to the electrode 14. A nut 70 fixed to the spindle 10 is in mesh with one end of a threaded rod 72. The other end of the threaded rod 72 is coupled to a driving shaft of a pulse motor 74, so that the electrode 14 is moved in the Z-axis direction according to the rotation of the pulse motor 74. When the pulse motor 74 is driven and the electrode 14 is moved downwardly, electro-discharge occurs between the electrode 14 and the workpiece 18 to form a hollow portion 18a on the workpiece 18 in a configuration corresponding to the configuration of the electrode 14.

As mentioned above, to form the hollow portion 18a by rough-machining, the electrode 14 is successively fed downwardly in the Z-axis direction, causing progressive electro-discharge machining. On the other hand, in a step of rough-machining of the hollow portion 18a, to provide a precise machined face on the hollow portion 18a the table 16 is fed inch by inch in X-axis and/or Y-axis direction within the horizontal plane. Thus, the workpiece 18 is allowed to make approach movements relative to the electrode 14 in the horizontal direction to apply finish electrode-discharge machining to the roughly machined bored portion 18a. To displace the table 16 in the X-axis direction, a threaded rod 78 meshed with a nut 76, which is fixed to the table 16, is rotated by a pulse motor 80 imparting X-axis direction movement to the table 16. On the other hand, to displace the table 16 in the Y-axis direction, a movable base 82, on which whole of the table 16 is placed, is moved by a drive mechanism comprised of a nut 84 fixed to the movable base 82, a threaded rod 86 in mesh with the nut 84 and a pulse motor for rotating the threaded rod 86, conjointly moving the table 16 in the Y-axis direction. This drive mechanism for moving the table 16 on which the workpiece is mounted is common to an ordinary electro-discharge machining apparatus and therefore a further detailed description thereof is omitted. However, in this connection, it is to be noted that according to the conventional electro-discharge machining method, the table 16 is moved only uniformly in the X-axis and Y-axis directions within the horizontal plane. It cannot always assure precise finish because a precise finished surface cannot be obtained when the hollow portion 18a has a complicated configuration. Therefore, the present invention contemplates an electro-discharge machining method and apparatus which is capable of applying precise local finish-machining not only to the portion 18a having a female configuration as illustrated in FIG. 1 but to a machined portion having a male configuration and further capable of enhancing the operating efficiency of electro-discharge machining. More specifically, in the present invention, for applying relative approach movements in the X- and Y-axis directions within the horizontal plane between the electrode 14 and the workpiece 18, the movement area is divided into a plurality of quadrants within the horizontal plane and machining is progressively carried out by designating trajectories of the relative approach movements for the respective quadrants.

The quadrants of the movement area within the horizontal plane will now be explained.

Figure 2:
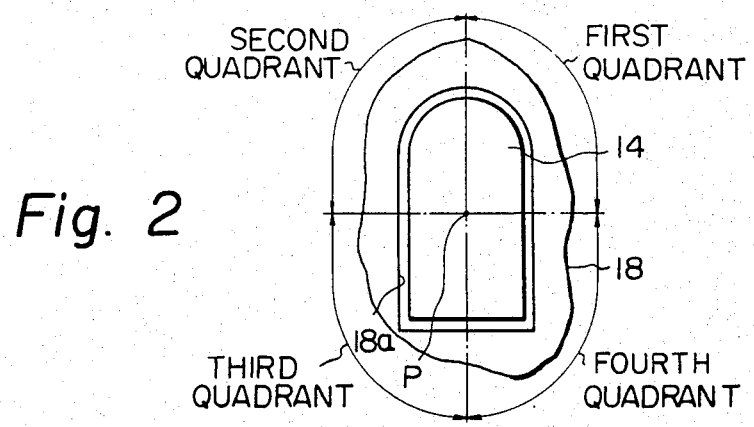
FIG. 2 is a sectional view of the machining portion illustrated in FIG. 1 which is taken along a line II—II in FIG. 1 for explaining the electro-discharge machining method and the quadrants in accordance with the present invention.

FIG. 2 illustrates sections of the electrode 14 and the workpiece 18 taken by the horizontal plane for the convenience of explanation. In FIG. 2, to impart approach movements to the workpiece 18 relative to the electrode 14, the movement area is divided, for example, into four quadrants, i.e., first, second, third and fourth quadrants with a point P as a center. The number of the quadrants may be increased or reduced, but not to one, according to necessity. Thus, a plurality of quadrants are provided and trajectories of the relative approach movements are selected for the quadrants, respectively. For instance, in FIG. 2, each of the first and the second quandrant is assigned with an arcuate trajectory and each of the third and the fourth quadrant is assigned with a rectangular trajectory. In this connection, it is to be noted that the conventional relative approach movements in the horizontal plane according to the known electro-discharge machining method can never have two kinds of trajectories such as an arcuate trajectory and a rectangular trajectory as provided in the present invention. Therefore, according to the known electro-discharge machining method, if finish machining is conducted with a view to improvement of an arcuate face of the hollow portion 18a, finish machining for a corner of the portion 18a is not satisfactory, while if finish machining is conducted mainly for improvement of the corner of the portion 18a, the arcuate face thereof cannot have a sufficient result.

The formation, operation and effect of the electro-discharge machining apparatus for carrying out the electro-discharge machining method of the invention will now be described referring to FIG. 3.

Figure 3B:
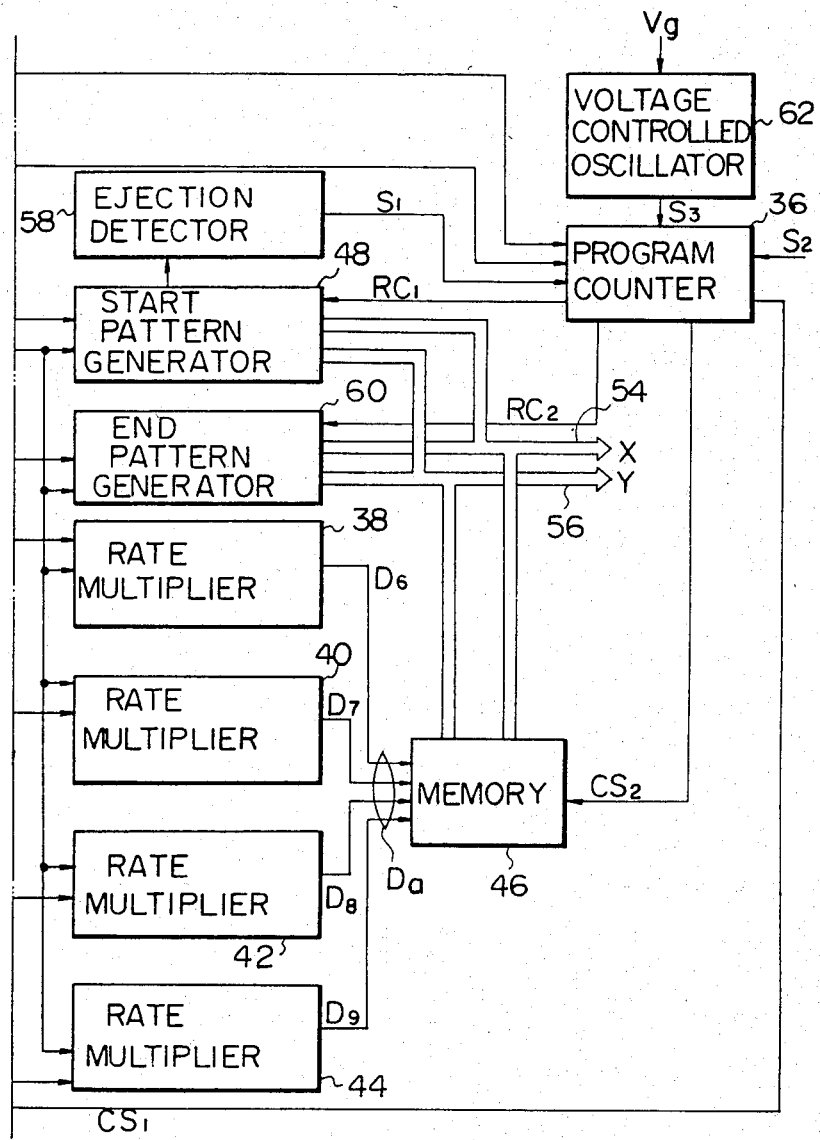

FIG. 3 is a block diagram of one form of a control section of the electro-discharge machining apparatus for progressively achieving electro-discharge machining according to the desired trajectories selected for the respective quadrants. In FIG. 3, switch means 20 sets and inputs, in the form of digital data, amounts of steps which trace the trajectory selected for each of the quadrants. The step amount of, for example, from 3 $\mu$m to 9.999 mm can be set by an operator who operates four-digit digital switches 20a to 20d. The step data set by the switch means 20 is stored in a step data latch memory 22.

On the other hand, a pattern selecting switch device 24 comprised of four switches 24a to 24d is provided to designate trajectory patterns of the relative movements which is to be implemented in the respective quadrants. The switches 24a to 24d of the pattern selecting switch device 24 output selecting data $D_1$, $D_2$, $D_3$ and $D_4$ corresponding to respective patterns $P_1$ to $P_4$ selected for the areas of the first to fourth quadrants, respectively. These selecting data $D_1$ to $D_4$ are input to pattern generators 26, 28, 30 and 32, respectively. Each of the pattern generators 26, 28, 30 and 32 stores therein a plurality kind of preset basic patterns. A basic pattern selected by a corresponding switch is selected according to the selecting data, and a desired selected pattern data is swept out in response to a clock pulse produced by a clock pulse generator 34. The sweeping-out operations of patterns from the respective pattern generators 26, 28, 30 and 32 are carried out in the order pursuant to a sweeping-out command signal $CS_1$ from a program counter 36.

The pattern generator 26 has four output lines $+X_1$, $-X_1$, $+X_1$ and $-Y_1$ and provides a trajectory information by outputting a pulse to an output line corresponding to an information for moving the workpiece 18 in a positive X-axis direction, in a negative X-axis direction, in a positive Y-axis direction or in a negative Y-axis direction within the X-Y coordinate plane. Each of the other pattern generators 28, 30 and 32 has similarly four output lines, and the output lines of these pattern generators are denoted by similar marks having different suffixes in FIG. 3. A group of the output lines designating the same coordinate direction are coupled commonly to each other and coupled to an input terminal of a rate multiplier 38, 40, 42 or 44. Each of the rate multipliers 38, 40, 42 and 44 receives a latch data $D_5$ latched in the step data latch memory 22 so that input signals to the respective rate multipliers are demultiplied according to contents of the latch data $D_5$. As a result, output data $D_6$ to $D_9$ from the respective rate multipliers 38 to 44 are obtained as desired actual movement trajectory data over the four quadrants according to the basic patterns selected by the pattern selecting switch means 24 and the step amounts selected by the switch device 20. The data $D_6$ designates information of a positive X-axis direction movement, $D_7$ information of a negative X-axis direction movement, $D_8$ information of a positive Y-axis direction movement and $D_9$ information of a negative Y-axis direction movement. Actual movement trajectory data $D_a$ comprised of the data $D_6$ to $D_9$ is stored in a memory 46. Operations of writing into and reading out of the memory 46 are controlled by a command signal $CS_2$ from the program counter 36.

Prior to carrying out the relative approach movements between the electrode 14 and the workpiece 18 in the horizontal direction to trace the selected movement trajectories and carrying out precise electro-discharge machining, a start pattern generator 48 produces a start pattern for moving, relative to the electrode 14, the workpiece 18 to a starting coordinate point of the movement trajectories. The start pattern generator 48 is connected to a start button 50. Upon depression of the start button 50, the level of a line 52 becomes "1" to establish a condition where the start pattern corresponding to the contents of the latch data $D_5$ is read out. The reading-out operation of the start pattern is implemented by a reading-out clock $RC_1$ from the program counter 36. The read-out data are fed to a bus line 54 for X-axis data and to a bus line 56 for Y-axis data and applied to the X- and Y-axis direction drive mechanism of the electro-discharge machining apparatus as described above. Therefore, the drive mechanism displaces, for example, the table 16 as illustrated in FIG. 1 in the X-axis direction and/or in the Y-axis direction to allow relative approach movement between the electrode 14 and the workpiece 18, according to the start pattern, into the starting coordinate point of the movement trajectories corresponding to the selected patterns. When an ejection detecting circuit 58 detects completion of ejection of the start pattern from the start pattern generating circuit 48, a detection signal $S_1$ is input to the program counter 36. When the program counter 36 receives the signal $S_1$, it detects a state ready to initiate precise electro-discharge machining by tracing the relative approach movement trajectories according to the patterns selected for the respective quadrants and outputs a command signal $CS_2$ so as to supply the actual movement trajectories data stored in the memory 46 to the bus lines 54 and 56. The data for actual movement trajectories supplied to the bus lines 54 and 56 are applied to the X- and Y-axis drive mechanism so that the table 16 (FIG. 1) is displaced in X-axis and/or Y-axis direction to follow, in the respective quadrants, the trajectories of the relative approach movements according to the selected patterns for achieving a desired precise electro-discharge machining. When the trajectory in the final quadrant, for example in the fourth quadrant as in the illustrated embodiment, has been passed, a reading-out clock $RC_2$ is applied from the program counter 36 to an end pattern generating circuit 60 and an end pattern is generated from the end pattern generating circuit 60 to return the relative position between the electrode 14 and the workpiece 18 to the origin point P (FIG. 2). The step amount of the end pattern generated from the end pattern generating circuit 60 depends upon the step amount data stored in the step data latch memory 22. The end pattern generated from the end pattern generating circuit 60 is supplied to the bus lines 54 and 56 and applied to the X- and Y-axis direction drive mechanism to displace the table 16 (FIG. 1) in the X-axis and/or Y-axis directions to the origin point P in the same manner as in case of the start pattern. Thus, one cycle of the electro-discharge machining is completed, but the following cycle of the electro-discharge machining may further be conducted through assistance of the program counter 36. To fully stop the operation of the electro-discharge machining apparatus, a stop command button 59 may be depressed to feed a stop command signal to the program counter 36, which will stop the outputting of the data of the actual movement trajectories from the memory 46. Of course, the stop command button 59 may be operated in any cycle of the electro-discharge machining operation to cause the program counter 36 to generate stop command signal. The program counter 36 may be coupled to a voltage controlled oscillator 62 which is responsive to a voltage $V_g$ across a gap between the electrode 14 and the workpiece 18 for producing a pulse signal $S_3$ having a frequency corresponding to the gap voltage $V_g$, so that the program counter 36 may be servo-controlled to command the memory 46 to feed data at a speed corresponding to the frequency of the pulse signal $S_3$. With this formation, the electro-discharge machining operation following the trajectories of the relative approach movements in the respective quadrants can be controlled with respect to its operation speed. Therefore, if chips exist in the gap between the electrode 14 and the workpiece 18, the speed of the electro-discharge machining operation may be increased to expel the chips out of the gap. Furthermore, electric discharge interruption detecting signal $S_2$ may be input to the program counter 36 to provide, to the counter 36, information of electric discharge interruption during the electro-discharge machining operation according to the selected patterns. In this case, if electric discharge across the gap between the electrode 14 and the workpiece 18 is interrupted, electro-discharge machining operation progressing along the trajectories of the relative approach movements in the respective quadrants can be suspended to avoid an idle operation of the electro-discharge machining apparatus.

In the arrangement as illustrated in FIG. 3, each of the pattern generating circuits or the pattern generators may be formed of a known ROM (read-only memory) and the latch memory may be formed of a RAM (random access memory). This formation allows employment of a commercial microcomputer available at a reasonable price in the market for constructing the arrangement of FIG. 3 and therefore enables reduction in manufacturing cost of the entire electro-discharge machining apparatus.

What is claimed is:

1. An electro-discharge machining method for progressively conducting precise machining through relative straight and arcuate approach movements between an electro-discharge machining electrode and a workpiece in the horizontal direction substantially perpendicular to a direction in which said electrode is opposed to said workpiece, which method is characterized by dividing a movement region of said relative approach movements into a plurality of straight and arcuate sections within the horizontal plane and designating trajectories of said relative straight and arcuate approach movements for the respective straight and arcuate sections for successively and progressively achieving the machining.

2. An electro-discharge machining method for progressively conducting precise machining through relative straight and arcuate approach movements between an electro-discharge machining electrode and a workpiece in the horizontal direction substantially perpendicular to a direction in which said electrode is opposed to said workpiece, which method is characterized by generating basic straight and arcuate movement patterns for said relative approach movements; dividing a movement region of said relative approach movements within the horizontal plane into respective straight and arcuate sections; designating desired straight and arcuate patterns in said basic movement patterns to the respective sections; designating step amounts of actual relative approach movements in the respective sections; computing actual trajectories for said actual relative straight and arcuate approach movements based on designated patterns and designated step amounts and storing data of said actual trajectories; and, carrying out relative straight and arcuate approach movements in accordance with stored data, the computing and storing comprising converting said basic movement patterns into actual movement patterns based on the designated step amounts and storing data of said actual movement patterns.

3. An electro-discharge machining method for automatically and progressively conducting precise machining through relative translating movements between an electro-discharge machining electrode and a workpiece along a predetermined closed trajectory in the horizontal direction substantially perpendicular to a direction in which said electrode is opposed to said workpiece, said electrode having a predetermined end surface configuration with straight and arcuate portions corresponding to the desired workpiece configuration but smaller in size than the desired workpiece configuration, said method comprising the steps of:

(a) storing a plurality of basic straight and arcuate pattern data in a storage device, each basic pattern data corresponding to a portion of the desired workpiece configuration;

(b) successively and automatically reading out each basic pattern data;

(c) successively and automatically translating said machining electrode relative to said workpiece in straight and arcuate motions in accordance with each of said plurality of basic pattern data read out from the storage device, each translation straightly or arcuately moving said machine electrode related to said workpiece closely adjacent but spaced from one of said portions of the desired workpiece configuration; and, (d) while carrying out said translating step applying voltage to said machining electrode to produce a discharge between said machining electrode and said workpiece whereby precise machining of said workpiece may be achieved by relatively moving said machining electrode and workpiece along a trajectory defining the desired configuration, the reading step comprising reading out basic pattern data in succession corresponding to contiguous portions of the desired workpiece configuration.

* * * * *